United States Patent
Suzuki et al.

(10) Patent No.: US 9,965,061 B2
(45) Date of Patent: May 8, 2018

(54) INPUT DEVICE AND VEHICLE

(71) Applicant: DENSO CORPORATION, Kariya, Aichi-pref. (JP)

(72) Inventors: Tsuyoshi Suzuki, Kariya (JP); Shigeaki Nishihashi, Kariya (JP); Shinsuke Hisatsugu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/300,804

(22) PCT Filed: Apr. 6, 2015

(86) PCT No.: PCT/JP2015/001914
§ 371 (c)(1),
(2) Date: Sep. 30, 2016

(87) PCT Pub. No.: WO2015/155973
PCT Pub. Date: Oct. 15, 2015

(65) Prior Publication Data
US 2017/0024023 A1      Jan. 26, 2017

(30) Foreign Application Priority Data

Apr. 10, 2014   (JP) .................................. 2014-081297

(51) Int. Cl.
*G06F 3/039*      (2013.01)
*G06F 3/038*      (2013.01)
(Continued)

(52) U.S. Cl.
CPC .......... *G06F 3/039* (2013.01); *B60R 11/0264* (2013.01); *B60R 16/023* (2013.01);
(Continued)

(58) Field of Classification Search
CPC ............... G06F 3/0354; G06F 3/04847; G06F 3/04817; G06F 3/039; G06F 3/038;
(Continued)

(56) References Cited

U.S. PATENT DOCUMENTS 6,025,831 A       2/2000   Gardiner
2005/0195167 A1   9/2005   Matsumoto et al.
(Continued)

FOREIGN PATENT DOCUMENTS

JP   2005250983 A    9/2005
JP   2009255609 A   11/2009
(Continued)

*Primary Examiner* — Ariel Balaoing
(74) *Attorney, Agent, or Firm* — Harness, Dickey & Pierce, P.L.C.

(57) ABSTRACT

An input device including an operating portion and a palm rest is provided. The operation portion includes an operating surface for accepting an operating input from a fingertip. The palm rest is positioned forward of the operating surface as viewed from an operator who places a palm on the palm rest. A tangent plane of a palm-resting surface of the palm rest is disposed on a front surface side of the operating surface. A portion of the operating surface that is close to the palm rest is inclined so that the portion of the operating surface becomes closer to the palm-resting surface of the palm rest as the portion of the operating surface is closer to the palm rest, as compared with another portion of the operating surface that is apart from the palm rest.

20 Claims, 12 Drawing Sheets

(51) Int. Cl.
*G06F 3/048* (2013.01)
*B60R 11/02* (2006.01)
*G06F 3/0354* (2013.01)
*B60R 16/023* (2006.01)
*G06F 3/0487* (2013.01)
*G06F 3/01* (2006.01)
*G06F 3/0481* (2013.01)
*G06F 3/0484* (2013.01)
*G06F 3/0488* (2013.01)

(52) U.S. Cl.
CPC ............ *G06F 3/016* (2013.01); *G06F 3/038* (2013.01); *G06F 3/0354* (2013.01); *G06F 3/03547* (2013.01); *G06F 3/03548* (2013.01); *G06F 3/0487* (2013.01); *G06F 3/0488* (2013.01); *G06F 3/04817* (2013.01); *G06F 3/04847* (2013.01); *G06F 3/04883* (2013.01)

(58) Field of Classification Search
CPC ............. G06F 3/03547; G06F 3/04883; G06F 3/0487; B60R 11/0264; B60R 16/023
See application file for complete search history.

(56) References Cited

U.S. PATENT DOCUMENTS

| | | | |
|---|---|---|---|
| 2009/0195659 A1* | 8/2009 | Nagata | G06F 3/03547 348/207.1 |
| 2009/0259357 A1 | 10/2009 | Aoki | |
| 2013/0300709 A1 | 11/2013 | Arakawa | |
| 2015/0286291 A1* | 10/2015 | Bigand | G06F 3/03549 345/184 |

FOREIGN PATENT DOCUMENTS

| | | |
|---|---|---|
| JP | 2013235359 A | 11/2013 |
| JP | 2014133474 A | 7/2014 |
| WO | WO-2014167777 A1 | 10/2014 |

* cited by examiner

INPUT DEVICE AND VEHICLE

CROSS REFERENCE TO RELATED APPLICATIONS

This application is a U.S. National Phase Application under 35 U.S.C. 371 of International Application No. PCT/JP2015/001914 filed on Apr. 6, 2015 and published in Japanese as WO 2015/155973 A1 on Oct. 15, 2015. This application is based on and claims the benefit of priority from Japanese Patent Application No. 2014-081297 filed on Apr. 10, 2014. The entire disclosures of all of the above applications are incorporated herein by reference.

TECHNICAL FIELD

The present disclosure relates to an input device that includes an operating surface, which accepts an operating input from an operator's fingertip, and a palm rest on which an operator's palm is to be placed. The present disclosure also relates to a vehicle having the input device.

BACKGROUND ART

An input device of this type was previously proposed, for instance, in Patent Literature 1. This input device includes two touchpads. The touchpads each have an operating surface and are not parallel to each other. A convex is formed on a portion that is contact with the two touchpads. A palm rest is disposed at a position below the convex.

PRIOR ART LITERATURE

Patent Literature

Patent Literature 1: JP2013-235359A

SUMMARY OF INVENTION

The inventors of the present disclosure have obtained the following findings about the input device.

In a situation where the input device is disposed on the upper surface of a vehicle console or a driver seat armrest and operated by a driver or an occupant of a front passenger seat, the operability improves when the palm-resting surface of a palm rest is positioned above the operating surface of a touchpad. That is to say, improved operability is provided when the tangent plane of the palm-resting surface is disposed on a front surface side of the operating surface of the touchpad. If the touchpad configured as described in Patent Literature 1 is employed in a situation where the palm-resting surface is positioned above the operating surface of the touchpad, the operating surface close to the palm rest inclines away from the palm-resting surface when the operating surface comes closer to the palm rest. As a result, nails are likely to come into contact with the operating surface.

The present disclosure has been made in view of the above circumstances and has an object to provide an input device having an operating surface for accepting an operating input made by a fingertip of an operator and a palm rest on which a palm of the operator is placed. Further, the present disclosure has another object to make the operating surface operable within a large region in a vehicle having the input device.

An input device in an aspect of the present disclosure comprises: a palm rest on which a palm of an operator is placed; and an operating portion having an operating surface that accepts an operating input made by a fingertip. The palm rest is positioned forward of the operating surface as viewed from the operator. A tangent plane of a palm-resting surface of the palm rest is disposed on a front surface side of the operating surface (if, for instance, the operating surface faces upward, the tangent plane is disposed above the operating surface). Therefore, the operating surface is easily operable. Further, a portion of the operating surface is inclined so that the portion of the operating surface becomes closer to the palm-resting surface of the palm rest as the portion of the operating surface is closer the palm rest, as compared with another portion of the operating surface that is apart from the palm rest. Consequently, no matter whether a portion of the operating surface that is operated is close to or apart from the palm rest, there is a decrease in the angle between the operating surface and the tangent plane of the finger pad of a finger operating the operating surface. As a result, operability of the operating surface is secured over a large region.

The operating portion may accept an operating input that is made when the operating portion is moved. In such an instance, the operating portion not only accepts an operating input made by a fingertip through the operating surface, but also accepts an operating input made when the operating portion is moved. It signifies that two different operating inputs can be accepted by only one operating portion. This enables different operating procedures without need of a change in operating fingers in accordance with an operating screen and reduces time, and decrease the number of parts required for the whole input device. Further, in such an instance, motor drive control may be exercised to inhibit the operating portion from being moved while the operating surface is accepting an operating input. In such a situation, the operating surface does not move while the operating surface is operated. Therefore, the operability of the operating surface can be further improved.

BRIEF DESCRIPTION OF DRAWINGS

The above and other objects, features, and advantages of the present disclosure will become more apparent from the following detailed description made with reference to the accompanying drawings. In the drawings.

DESCRIPTION OF EMBODIMENTS

<Configuration of Embodiment>

Figure 1:
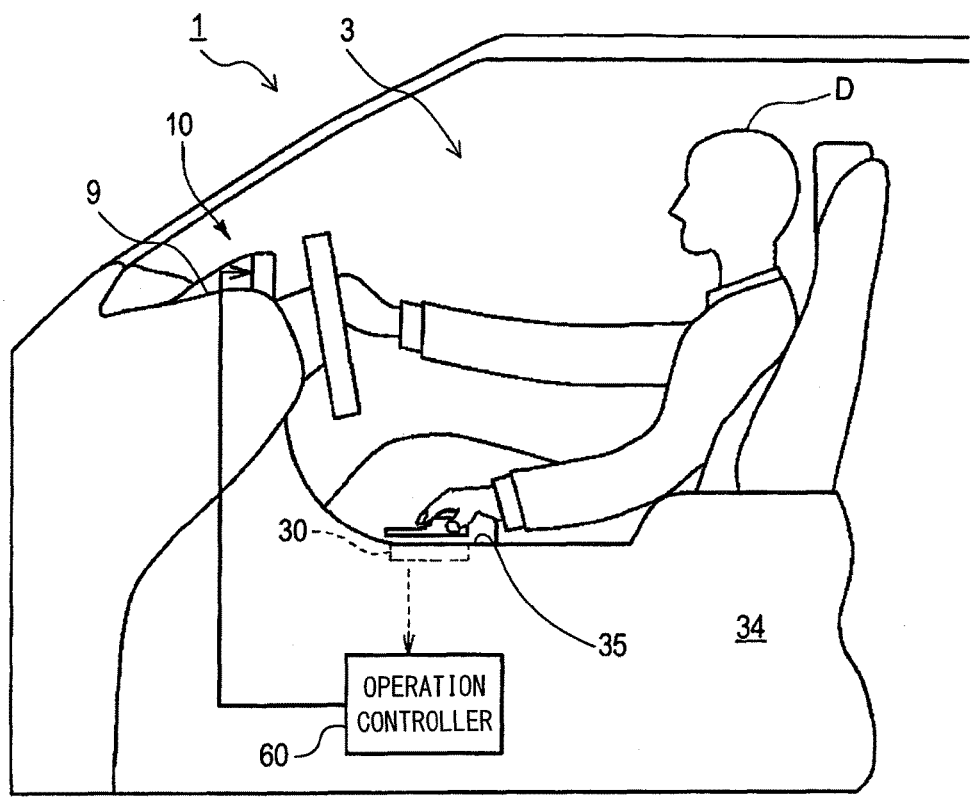
FIG. 1 is a schematic diagram illustrating a configuration of a vehicle according to an embodiment of the present disclosure.

An embodiment of the present disclosure will now be described with reference to the accompanying drawings. As illustrated in FIG. 1, a vehicle 1 according to the present embodiment includes a display 10 and a remote control apparatus 20, which are disposed in a vehicle compartment 3. The display 10 is mounted on the upper or front surface of a dashboard 9 (on a near side when viewed from a driver D) in order to display various information to the driver D. The remote control apparatus 20 includes an operating device 30 (an example of an input device) and an operation controller 60. The operating device 30 is mounted on a mounting face 35 disposed on the upper surface of a console 34. The operating device 30 is configured as described below.

Figure 2:
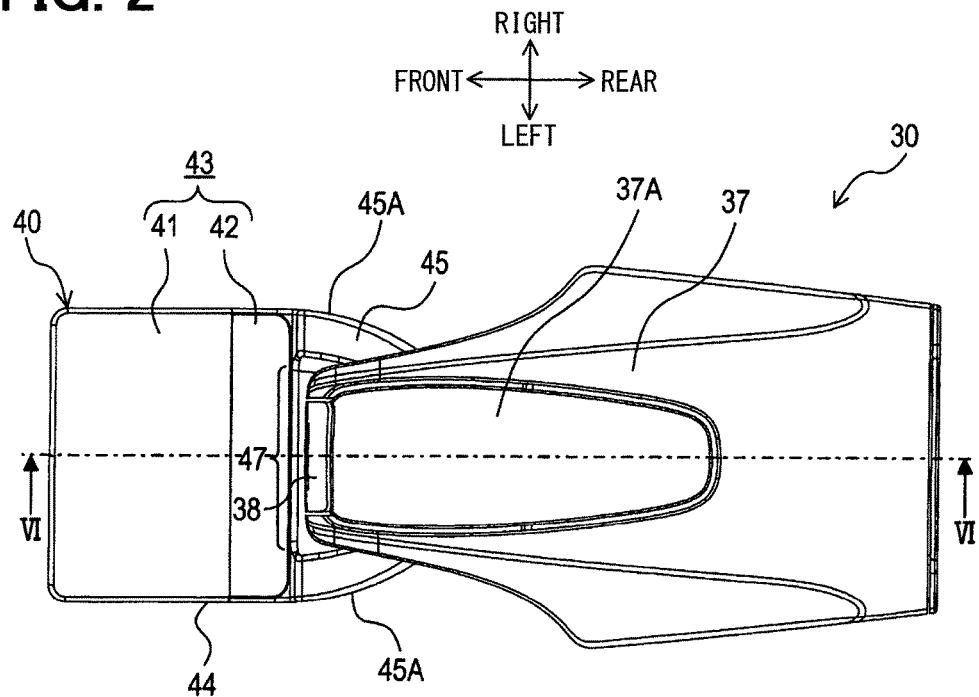
FIG. 2 is a plan view illustrating a configuration of an operating device in the vehicle.
Figure 3:
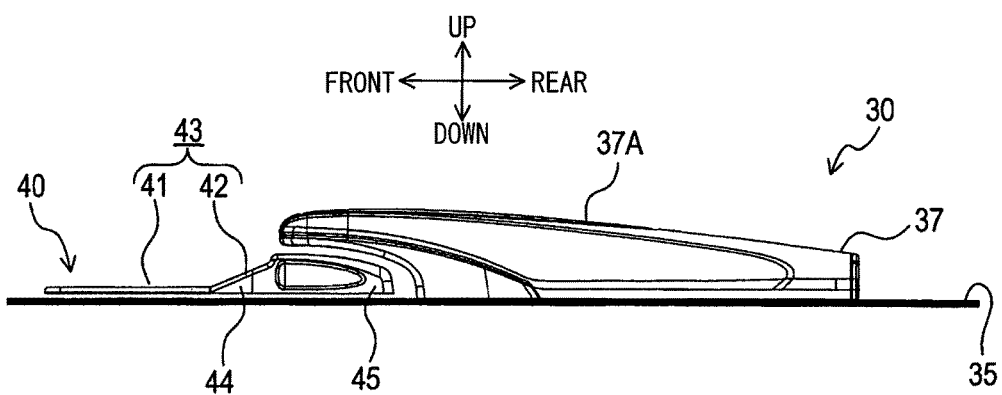
FIG. 3 is a left side view illustrating the configuration of the operating device.
Figure 4:
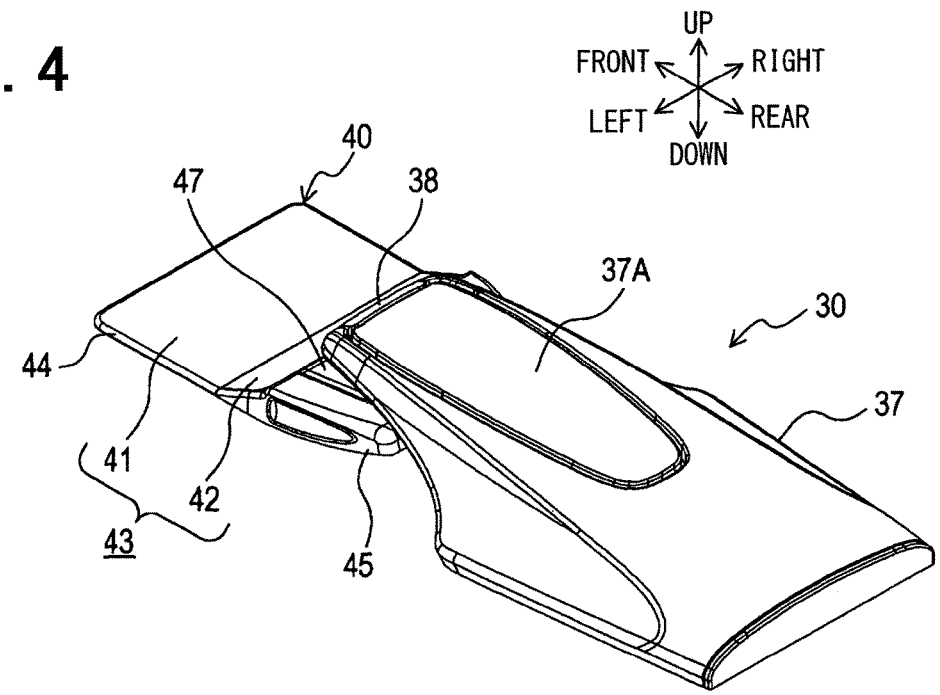
FIG. 4 is a perspective view illustrating the configuration of the operating device.
Figure 10:
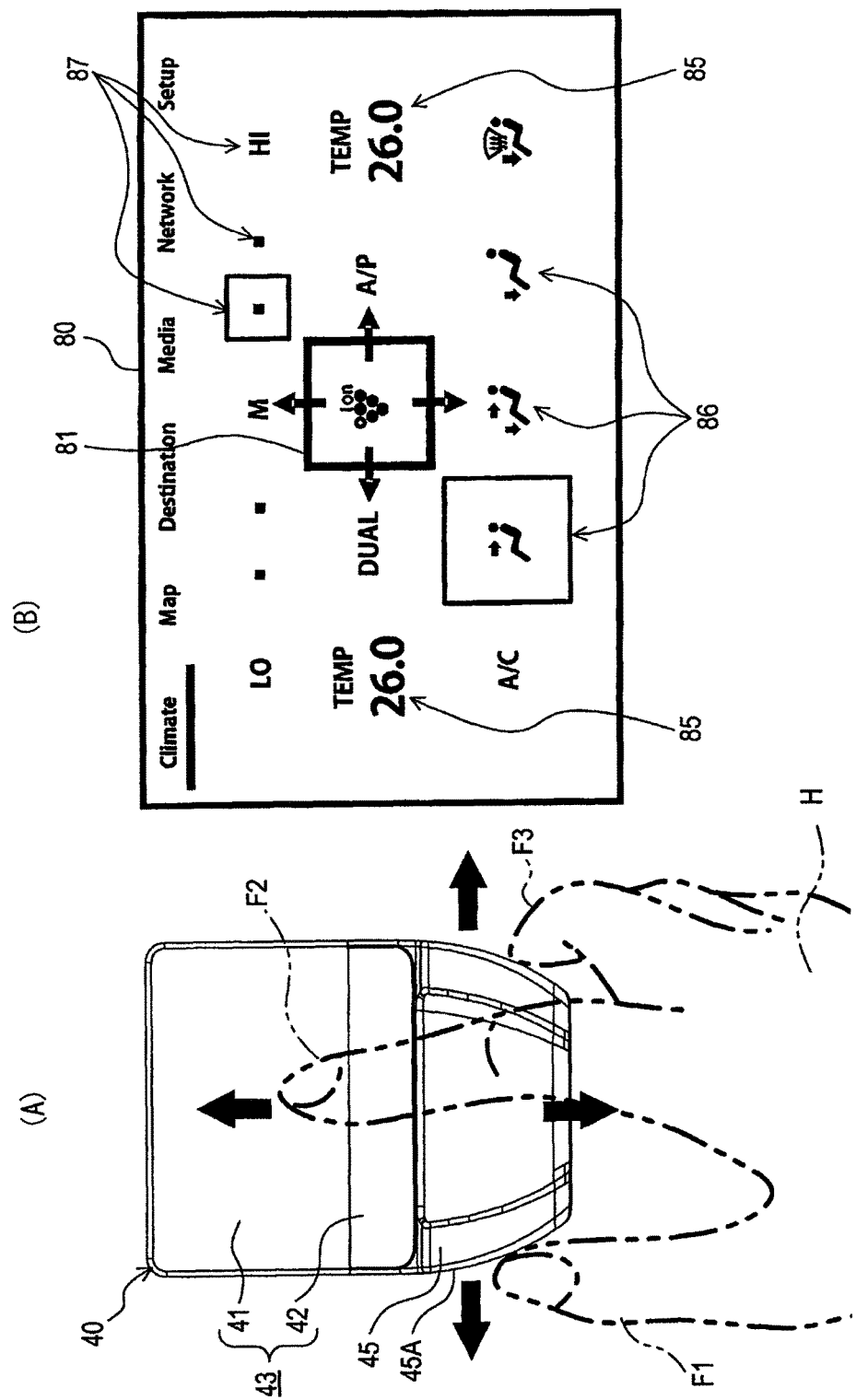
FIGS. 10(A) and (B) are diagrams illustrating an exemplary processing operation performed by the control system.

As illustrated in FIGS. 2 to 4, the operating device 30 includes a palm rest 37 and an operating portion 40. The palm rest 37 is a rest on which a palm H (see FIG. 10) of an operator (the driver D or an occupant of a front passenger seat) is placed. The operating portion 40 is disposed on the mounting face 35 and is movable as desired in the front-rear direction and in the left-right direction. The palm rest 37 is protruded upward from the rearward end of the movable range of the operating portion 40 on the mounting face 35 (protruded upward from the near end as viewed from the operator) and extended forward to the upper rear end of the movable range of the operating portion 40. An enter switch 38 is disposed on the front end of the palm rest 37. The enter switch 38 is operable both upward and downward.

The operating portion 40 includes a touchpad portion 44 and an operating knob portion 45. The surface of the touchpad portion 44 is divided into a first portion 41 and a second portion 42, which form an operating surface 43. The operating knob portion 45 is pinched by the operator when the operating portion 40 is to be moved as mentioned earlier. The first portion 41 is shaped like a rectangle having four sides (front, rear, left, and right sides) and is a flat surface parallel to the mounting face 35. The second portion 42 is joined to the rear end of the first portion 41 and shaped like a rectangle whose length in the front-rear direction is smaller than that of the first portion 41. Further, the second portion 42 has an inclined flat surface that approaches a palm-resting surface 37A of the palm rest 37 as the second portion 42 comes closer to the palm rest 37.

The operating knob portion 45 is joined to the rear end of the second portion 42 of the touchpad portion 44. The operating knob portion 45 has an appropriate thickness (length in the up-down direction) so that a pair of left and right lateral surfaces 45A can easily be pinched with fingers. Further, a concave 47 is formed on the upper surface of the operating knob portion 45 to face the enter switch 38.

Figure 5:
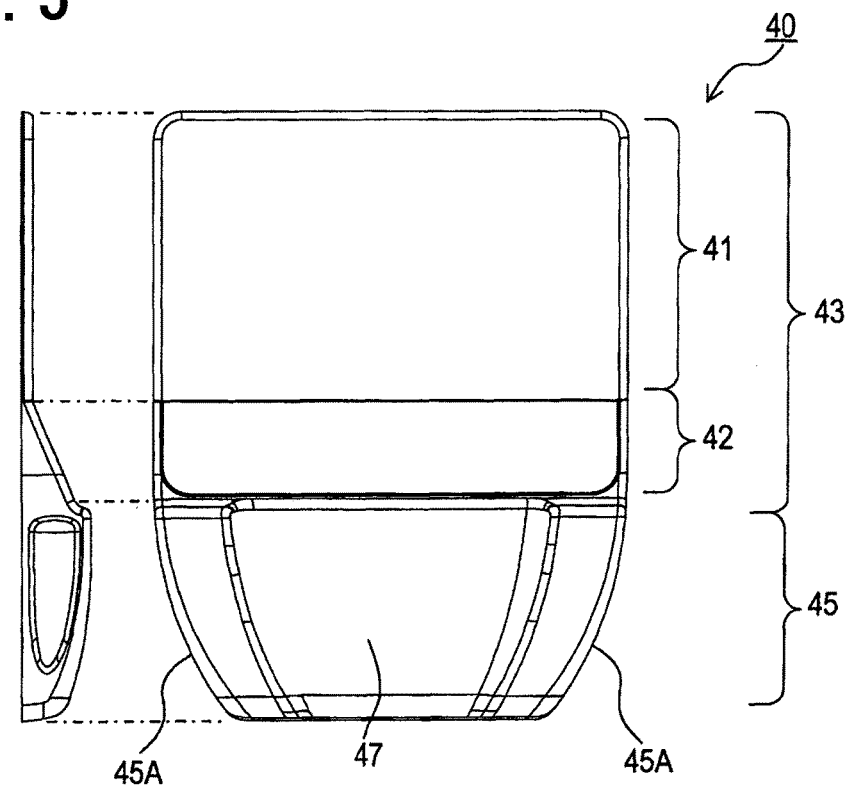
FIG. 5 includes a plan view and a left side view illustrating a configuration of an operating portion of the operating device.

As illustrated in FIG. 5, the pair of left and right lateral surfaces 45A of the operating knob portion 45 is curved so that the left-right spacing interval (that is, the width of the operating knob portion 45 in the left-right direction) gradually decreases in the rearward direction. The concave 47 is formed on the upper surface of the operating knob portion 45 and shaped to penetrate the operating knob portion 45 in the front-rear direction.

Further, as illustrated in FIG. 2, at least the front end of the concave 47 (a portion facing the enter switch 38 when the operating portion 40 is in a home position) is greater in width (length in the left-right direction) than the enter switch 38. Therefore, even when the operating portion 40 is moved over the mounting face 35, the concave 47 constantly exists below the enter switch 38.

Figure 6:
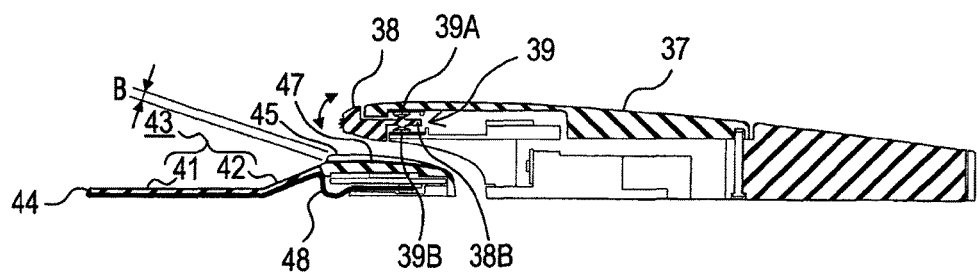
FIG. 6 is a cross-sectional view taken along line VI-VI of FIG. 2.
Figure 14:
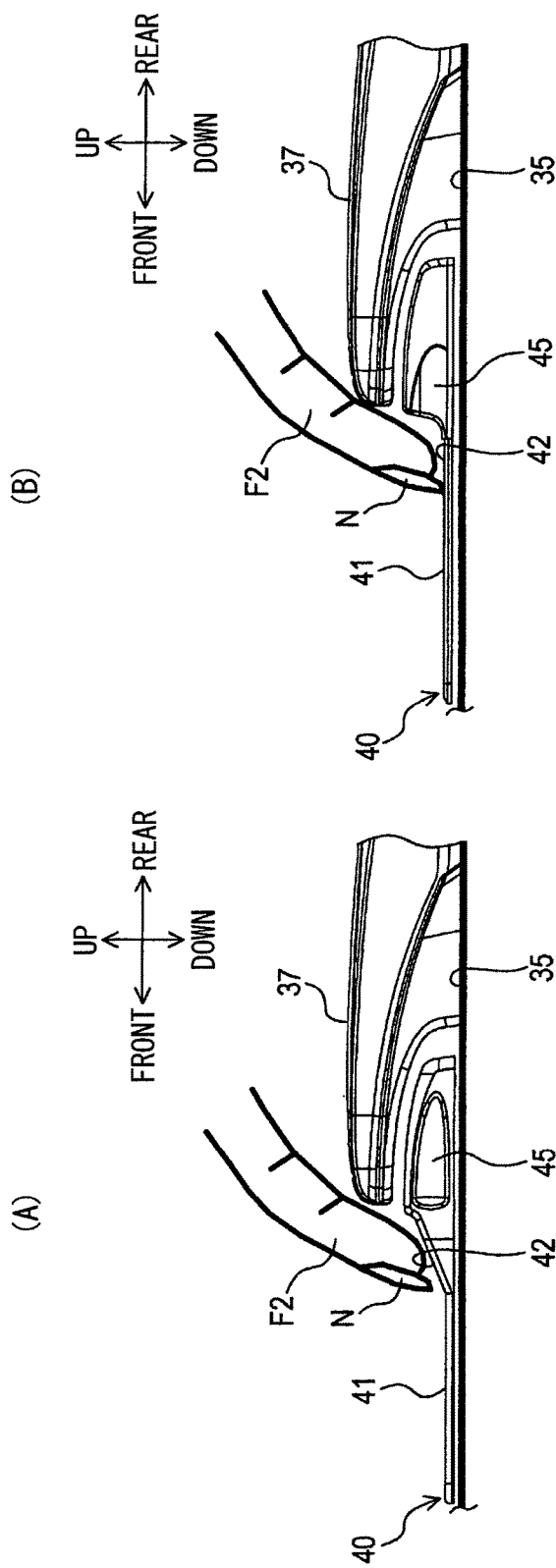
FIGS. 14(A) and (B) are diagrams illustrating advantageous effects of the operating device in comparison with effects of a comparative example.

As illustrated in FIG. 6, the enter switch 38 is extended into the palm rest 37. A leading end 38B of the enter switch 38 is supported by the interior of the palm rest 37 through a hinge (not shown). Thus, the enter switch 38 is pivotable in the up-down direction as indicated by the arrow in FIG. 6. Further, an enter detector 39 having two tactile switches 39A, 39B is disposed in the palm rest 37. When a portion of the enter switch 38 that is exposed out of the palm rest 37 is pulled upward, the tactile switch 39A is depressed by a portion of the enter switch 38 that is housed in the palm rest 37. When the portion of the enter switch 38 that is exposed out of the palm rest 37 is pressed downward, the tactile switch 39B is depressed by a portion of the enter switch 38 that is housed in the palm rest 37. The depth B of the concave 47 is designed so that the nail N of an index finger F2 (see FIG. 14) does not come into contact with the concave 47 and permits a proper operation of the enter switch 38 when it is manipulated as described above.

Figure 7:
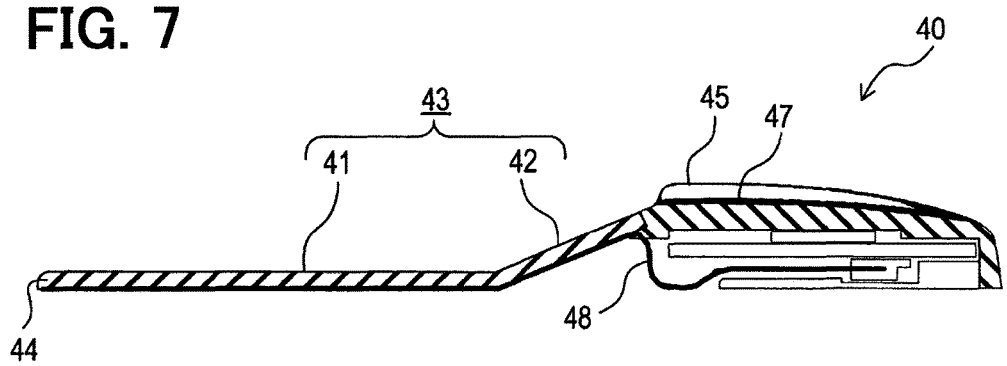
FIG. 7 is an enlarged cross-sectional view illustrating a configuration of the operating portion shown in FIG. 6.
Figure 8:
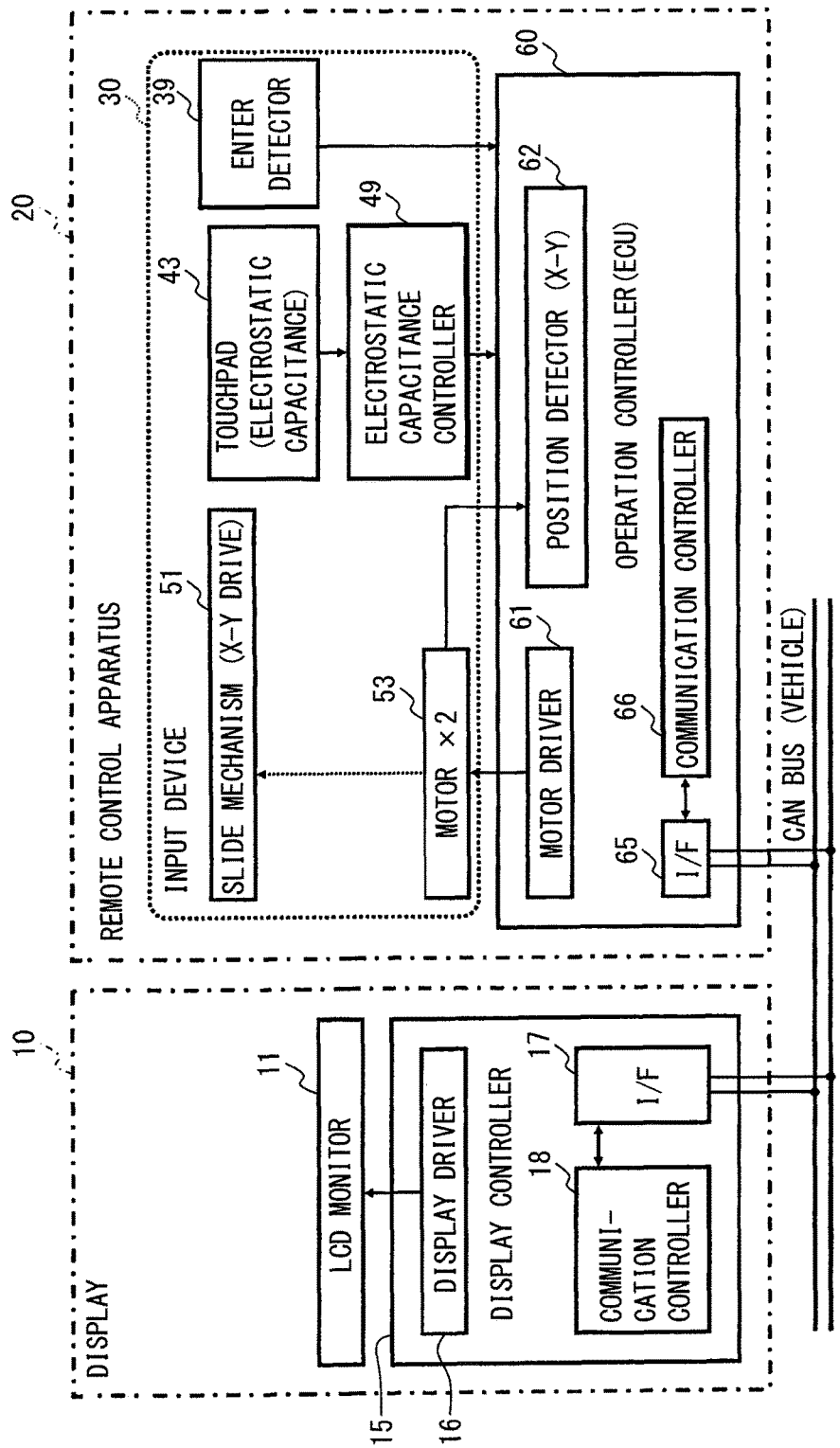
FIG. 8 is a block diagram illustrating a part of a control system in the vehicle.

As illustrated in FIG. 7, an electrostatic electrode path 48 is disposed on the lower surface of the touchpad portion 44 and extended over the lower surfaces of both the first portion 41 and the second portion 42. As illustrated in FIG. 8, the electrostatic electrode path 48 is connected to an electrostatic capacitance controller 49 so as to detect a portion that is touched by a fingertip of the operator when the electrostatic capacitance values of various portions are detected. For purposes of detection, a region having a predetermined width at the boundary between the first portion 41 and the second portion 42 is handled by the electrostatic capacitance controller 49 as a dead zone where no detection occurs even when it is touched by a fingertip.

FIG. 8 illustrates a part of a control system of the vehicle 1. More specifically, FIG. 8 illustrates only a portion related to the remote control apparatus 20 and the display 10. FIG. 8 uses solid line arrows to indicate electrical connections between various portions and uses a broken line arrow to indicate a mechanical connection between some portions. As illustrated in FIG. 8, a slide mechanism 51 includes a pair of motors 53. The slide mechanism 51 supports the operating portion 40 in such a manner that the operating portion 40 is slidable along the mounting face 35. The pair of motors 53 apply a reaction force respectively in the left-right direction (hereinafter may be referred to as the X-axis direction) and in the front-rear direction (hereinafter may be referred to as the Y-axis direction). Therefore, the reaction force oriented in any direction along the XY-plane can be applied to the operating portion 40. As the mechanism that applies the reaction force to the operating portion 40 in the above manner, various well-known mechanisms are applicable. For example, a mechanism disclosed in JP2005-250983A is applicable.

The result of detection by the enter detector 39, the result of detection by the electrostatic capacitance controller 49, and the drive amounts of the pair of motors 53 are inputted to the operation controller 60. The operation controller 60 drives the pair of motors 53 accordingly.

The operation controller 60 includes motor drivers 61 and a position detector 62. The motor drivers 61 drive the pair of motors 53. The position detector 62 detects the XY-direction position coordinates of the operating portion 40 in accordance with the drive amounts of the pair of motors 53. The operation controller 60 is informed of a microcomputer (ECU) having a CPU, a ROM, and a RAM. The operation controller 60 further includes a communication controller 66 that communicates with a CAN bus 70 through an interface (I/F) 65.

The display 10 includes an LCD monitor 11 and a display controller 15. The LCD monitor 11 displays an image. The display controller 15 controls the display state of the LCD monitor 11. The display controller 15 is also formed of a microcomputer having a CPU, a ROM, and a RAM. The display controller 15 further includes a display driver 16 and a communication controller 18. The display driver 16 drives the LCD monitor 11. The communication controller 18 communicates with the CAN bus 70 through an interface (I/F) 17.

<Control Exercised by Embodiment>

Figure 9:
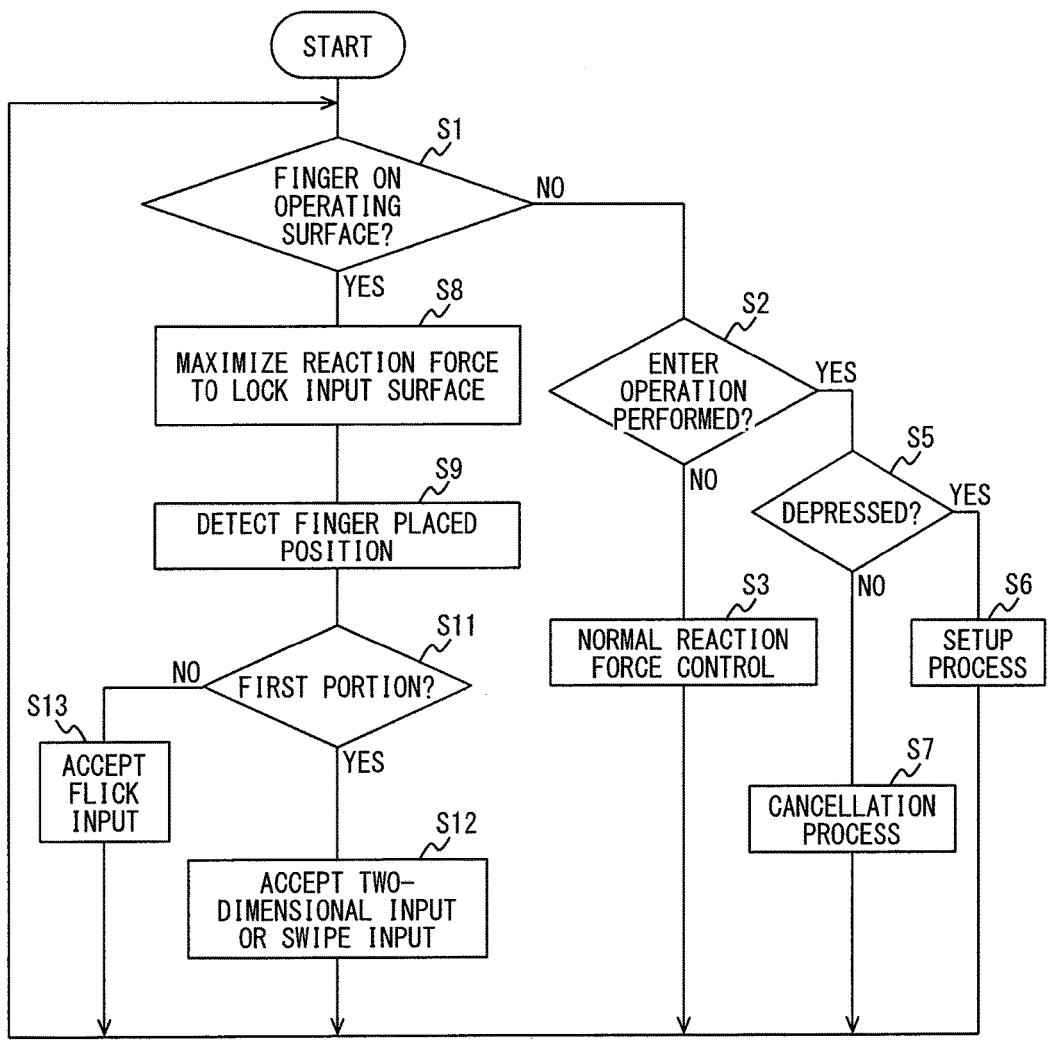
FIG. 9 is a flowchart illustrating a process performed by the control system.

Upon power turn-on, the CPU of the operation controller 60 performs a process illustrated in FIG. 9 in accordance with a program stored in the ROM of the operation controller 60. As illustrated in FIG. 9, first of all, S1 (hereinafter, S is an abbreviation of "step") is performed. In S1, a check is performed to determine based on a signal from the electrostatic capacitance controller 49 whether a finger is placed on the operating surface 43. If no finger is placed on the operating surface 43 (S1: N), processing proceeds to S2. In S2, a check is performed to determine based on the result of detection by the enter detector 39 whether the enter switch 38 is operated (ENTER operation). If the enter switch 38 is not operated (S2: N), processing proceeds to S3. In S3, normal reaction force control is exercised to apply a normal reaction force to the operating portion 40. Upon completion of S3, processing returns to S1. The normal reaction force control is exercised as described below.

FIG. 10(B) illustrates an example of a screen that appears on the LCD monitor 11. This screen is an air-conditioner setup screen 80 for performing setup about air-conditioning in the vehicle compartment 3. When the operating portion 40 is moved forward, rearward, leftward, or rightward as indicated by an arrow in FIG. 10(A), a certain other process (not shown) is performed to move a cursor 81 on the air-conditioner setup screen 80 upward, downward, leftward, or rightward in coordination with the movement of the operating portion 40. FIG. 10(A) illustrates a case where the palm H of the right hand of the operator is placed on the palm rest 37 to pinch the operating portion 40 with the thumb F1 and the middle finger F3 for purposes of operation. FIGS. 11(A) to 15 also illustrate a case where the operator uses the right hand to operate the operating device 30. Substantially the same explanation applies to a case where the operator uses the left hand to operate the operating device 30. In such an instance, substantially the same drawings are applicable except that the positions of the thumb F1 and the middle finger F3 are interchanged.

The air-conditioner setup screen 80 includes a pair of temperature setup icons 85 for separately setting the temperatures for a driver seat and a front passenger seat, a plurality of wind direction setup icons 86 for setting a wind direction, and a plurality of wind force setup icons 87 for setting a wind force. When the cursor 81 is positioned near an icon 85-87 during the normal reaction force control exercised in S3, a well-known process is performed, for example, to give a reaction force to the operating portion 40 so that the cursor 81 moves to the center of the icon 85-87.

Returning to FIG. 9, if it is determined in S2 that the enter switch 38 is operated (S2: N), processing proceeds to S5. In S5, a check is performed to determine whether the enter switch 38 is depressed. If the enter switch 38 is depressed (S5: Y), a setup process is performed in S6. Upon completion of S6, processing returns to S1. If, by contrast, it is determined in S5 that the enter switch 38 is not depressed but is lifted (S5: N), a cancellation process is performed in S7. Upon completion of S7, processing returns to S1.

Consequently, if the enter switch 38 is depressed while, for example, the cursor 81 is placed over a desired wind direction setup icon 86 or wind force setup icon 87 in the air-conditioner setup screen 80 illustrated in FIG. 10(B) (S2: Y; S5: Y), a wind direction or wind force associated with the position of the cursor 81 is set (S6). If the operator inadvertently depresses the enter switch 38, an entered setting can be cancelled (S7) immediately by lifting the enter switch 38 (S2: Y; S5: N).

If it is determined in S1 that a finger (for example, the index finger F2 depicted in FIG. 10(A)) is placed on the operating surface 43 (S1: Y), processing proceeds to S8. In S8, the reaction force applied from the pair of motors 53 to the operating portion 40 is maximized to lock and immobilize the operating portion 40. Performing this process immobilizes the operating surface 43 (pad surface) to improve the operability of the operating surface 43.

The above-described configuration for maximizing the reaction force to be applied from the pair of motors 53 to the operating portion 40 in order to immobilize the operating portion 40 is described in detail, for instance, in JP2009-255609A and will not be described in detail here. If the operating portion 40 is already locked when processing proceeds to S8, S8 is substantially skipped.

Upon completion of S8, processing proceeds to S9. In S9, a position on the operating surface 43 at which the finger is placed is detected. In S11, a check is performed to determine whether the finger is placed on the first portion 41. If the finger is placed on the first portion 41 (S11: Y), processing proceeds to S12. In S12, a two-dimensional input or a swipe input is accepted. Upon completion of S12, processing returns to S1. If, by contrast, it is determined in S11 that the finger is not placed on the first portion 41, that is, the finger is placed on the second portion (S11: N), processing proceeds to S13. In S13, a flick input is accepted. Upon completion of S13, processing returns to S1.

The two-dimensional input in S12 is made when the operator performs an input procedure of using the first portion 41 of the operating surface 43, for example, as a two-dimensional input device such as a handwriting input device. The swipe input is made when the operator performs an input procedure of touching the first portion 41 of the operating surface 43 with a sweeping blow. The flick input in S13 is made when the operator performs an input procedure of touching the second portion 42 of the operating surface 43 with a light, quick blow. These input procedures are explained below with concrete examples.

Figure 11:
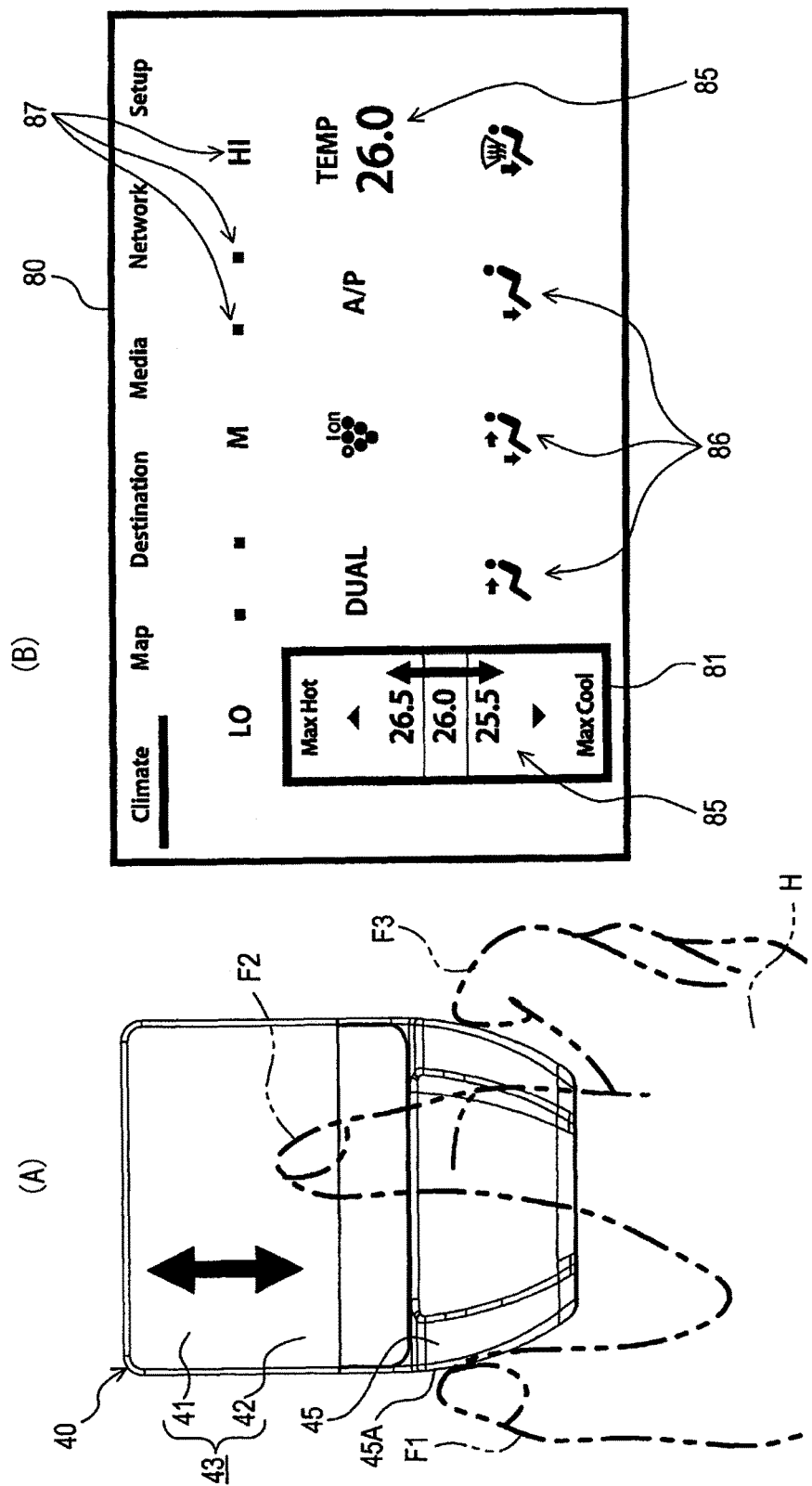
FIGS. 11(A) and (B) are diagrams illustrating another exemplary processing operation performed by the control system.

FIG. 11 are diagrams illustrating a swipe input. When, for instance, the cursor 81 is placed over a temperature setup icon 85 in the air-conditioner setup screen 80 as indicated in FIG. 11(B), numerical values (temperature settings) are vertically displayed within the cursor 81. If, in this instance, the first portion 41 is vertically swiped with an index finger F2 (or a certain other finger; this holds true hereinafter) as indicated by the arrow in FIG. 11(A) (S11: Y), the numerical values displayed within the cursor 81 scroll vertically (S12). By performing this procedure, the operator can adjust, as desired, the air-conditioner temperature setting displayed in the temperature setup icon 85.

Figure 12:
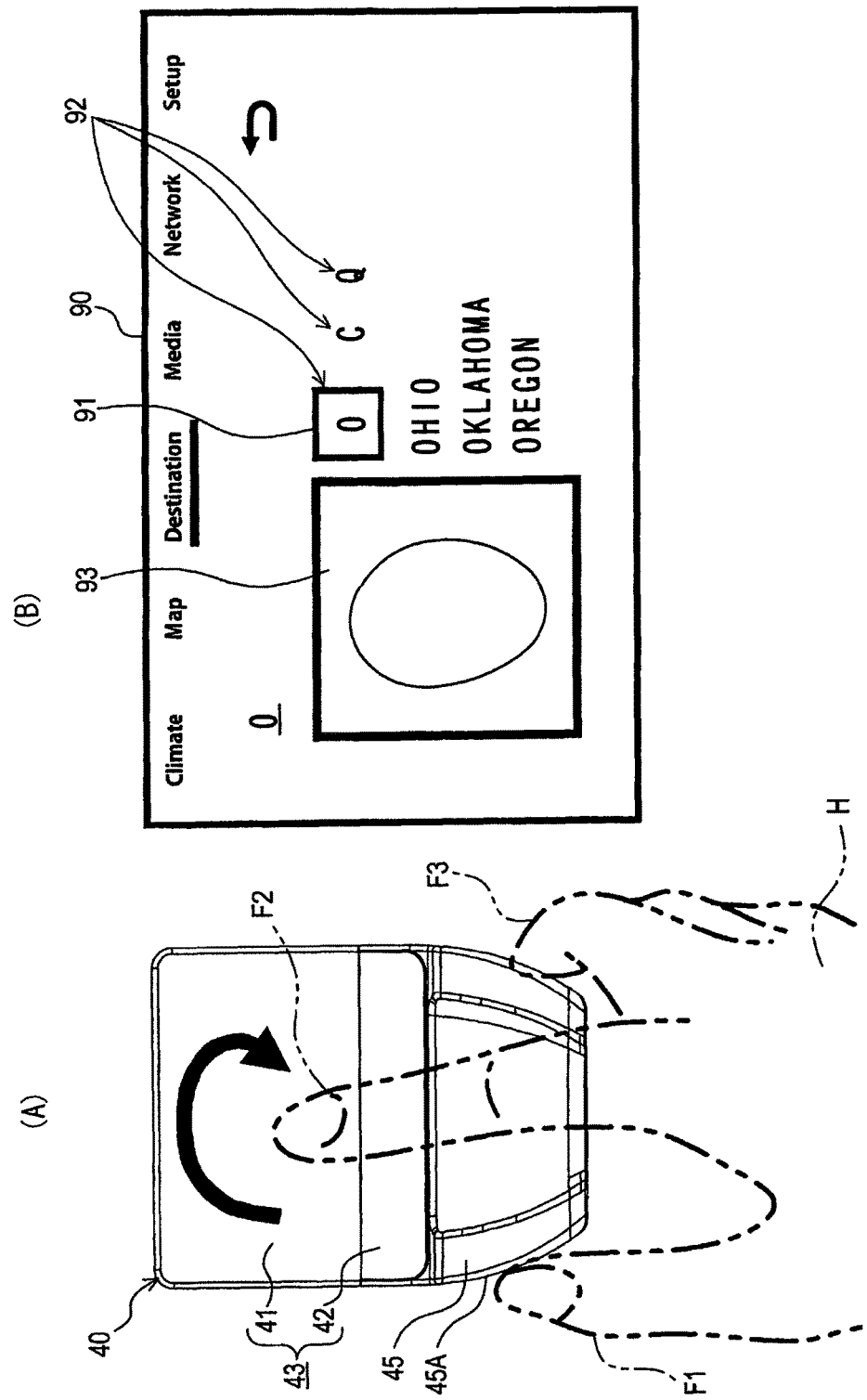
FIGS. 12(A) and (B) are diagrams illustrating yet another exemplary processing operation performed by the control system.

FIG. 12 are diagrams illustrating a two-dimensional input. FIG. 12(B) illustrates another exemplary screen displayed on the LCD monitor 11. The screen illustrated in FIG. 12(B) is a destination input screen 90 for inputting a destination for a car navigation apparatus (not shown). The destination input screen 90 includes a cursor 91, a character candidate icon 92, and a handwriting input area 93. When the operating portion 40 is moved forward, rearward, leftward, or rightward, the cursor 91 moves in the same direction. The character candidate icon 92 displays a character candidate. The handwriting input area 93 is used to input a character by handwriting it. If, in this instance, a character is inputted by handwriting to the first portion 31 with an index finger F2 as indicated by the arrow in FIG. 12(A) (S11: Y), a line indicative of a track touched by the index finger F2 is drawn in the handwriting input area 93. By performing this procedure, the operator can draw a desired character in the handwriting input area 93.

Figure 13:
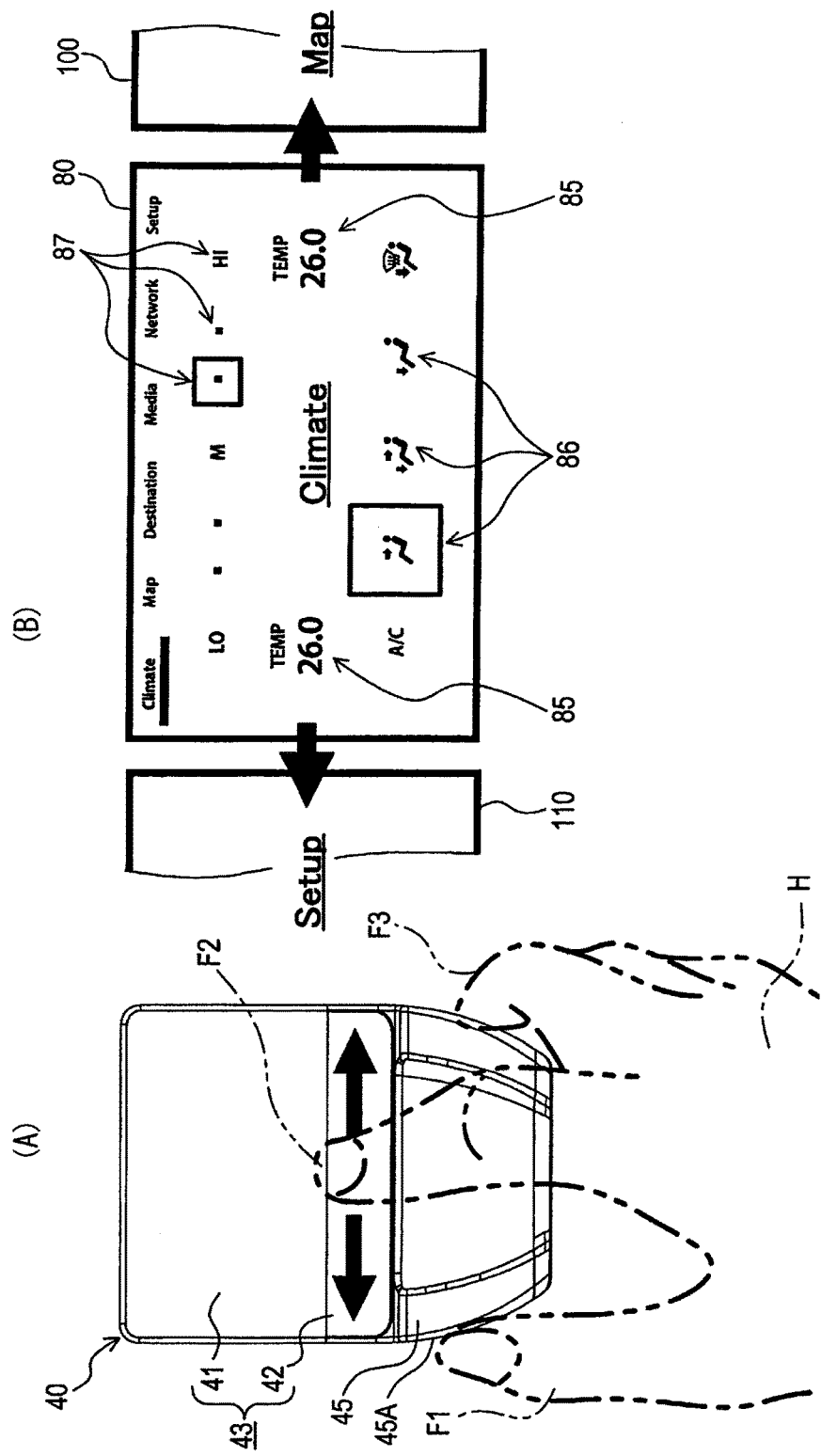
FIGS. 13(A) and (B) are diagrams illustrating still another exemplary processing operation performed by the control system.

FIG. 13 are diagrams illustrating a flick input. Let us assume, for example, that software is set up to display the air-conditioner setup screen 80 on the LCD monitor 11 and display a map screen 100 and a setup screen 110 adjacently to the air-conditioner setup screen 80 as illustrated in FIG. 13(B). The map screen 100 displays a map. The setup screen 110 is used by the operator to perform setup. If, in this instance, the index finger F2 is used to flick the second portion 42 in the left-right direction as indicated by the arrow in FIG. 13(A) (S11: N), the whole screen moves in the flicked direction (S13). As a result, the screen displayed on the LCD monitor 11 can be switched from the air-condition setup screen 80 to the map screen 100 or to the setup screen 110.

<Advantageous Effects of Embodiment>

As described above, the operating device 30 is configured so that the operating surface 43, which accepts an operating input made by a fingertip, is provided on the surface of the operating portion 40, which accepts an operating input made by XY-direction movement. More specifically, two different operating instruments (the operating knob portion 45 serving as a main operating instrument and the touchpad portion 44 serving as an auxiliary operating instrument) are integrated into the operating portion 40. Therefore, the operating time is reduced because various operating procedures can be performed without switching from one finger to another in response to an operating screen change. Further, the apparatus configuration can be simplified by decreasing the number of parts required for operating instruments in the vehicle 1.

Further, as described earlier, the palm rest 37 is protruded toward the top of the operating portion 40 from the rearward end of the movable range of the operating portion 40 on the mounting face 35 (protruded from the near end as viewed from the operator). That is to say, the whole tangent plane of the palm-resting surface 37A of the palm rest 37 on which the palm H is to be placed is disposed on the front surface side of the operating surface 43. Therefore, the operator (the driver D or the occupant of the front passenger seat) can successfully operate the operating portion 40 while seated with the palm H placed on the palm rest 37.

Furthermore, the second portion 42 has a flat surface that is inclined so that the second portion 42 becomes closer to the palm H's palm-resting surface 37A of the palm rest 37 with decreasing distance to the palm rest 37. Therefore, as indicated in FIG. 14(A), there is a decrease in the angle between the second portion 42 and the tangent plane of the ball of a finger (index finger F2) operating the second portion 42. Consequently, the operating device 30 according to the present embodiment improves the operability of the second portion 42.

More specifically, as indicated by a comparative example in FIG. 14(B), if the first portion 41 and the second portion 42 are formed as a series of flat surfaces parallel to the mounting face 35 and the operating knob portion 45 is erected from the rear end of the second portion 42, the operability may decrease. When the second portion 42 is operated in such an instance, the nail N of the index finger F2 operating the second portion 42 may come into contact with the second portion 42 to decrease the operability of the second portion 42. Meanwhile, the operating device 30 according to the present embodiment is configured so that there is a decrease in the angle between the second portion 42 and the tangent plane of the ball of the index finger F2 operating the second portion 42. This inhibits the nail N from coming into contact with the second portion 42 and improves the operability of the second portion 42. The angle of inclination of the second portion 42 from the mounting face 35 is preferably 45 degrees or so (30 to 60 degrees) although its optimum value varies with the apparatus configuration.

Moreover, the pair of left and right lateral surfaces 45A of the operating knob portion 45 is curved so that the left-right spacing interval (that is, the width in the direction of pinching) gradually decreases in the rearward direction. Therefore, if the operator has a small palm H so that there is a short interval W1 between the fingertip of the thumb F1 and the fingertip of the middle finger F3 when pinching the operating knob portion 45, the operator can pinch the rear portion of the operating knob portion 45 as indicated in FIG. 15(A). If, on the contrary, the operator has a large palm H so that there is a long interval W2 between the fingertip of the thumb F1 and the fingertip of the middle finger F3 when pinching the operating knob portion 45, the operator can pinch the front portion of the operating knob portion 45 as indicated in FIG. 15(B). Consequently, the operating portion 40 according to the present embodiment can be operated successfully irrespective of the size of a hand of the operator.

In the above-described embodiment, the mounting face 35 corresponds to a supporting face, the palm rest 37 corresponds to a palm rest, the first portion 41 corresponds to a first portion, the second portion corresponds to a second portion, the operating surface 43 corresponds to an operating surface, the operating portion 40 corresponds to an operating portion, the pair of motors 53 corresponds to a movement inhibition portion, the pair of left and right lateral surfaces 45A of the operating knob portion 45 corresponds to a pinch portion, and the enter switch 38 corresponds to a switch.

Figure 15:
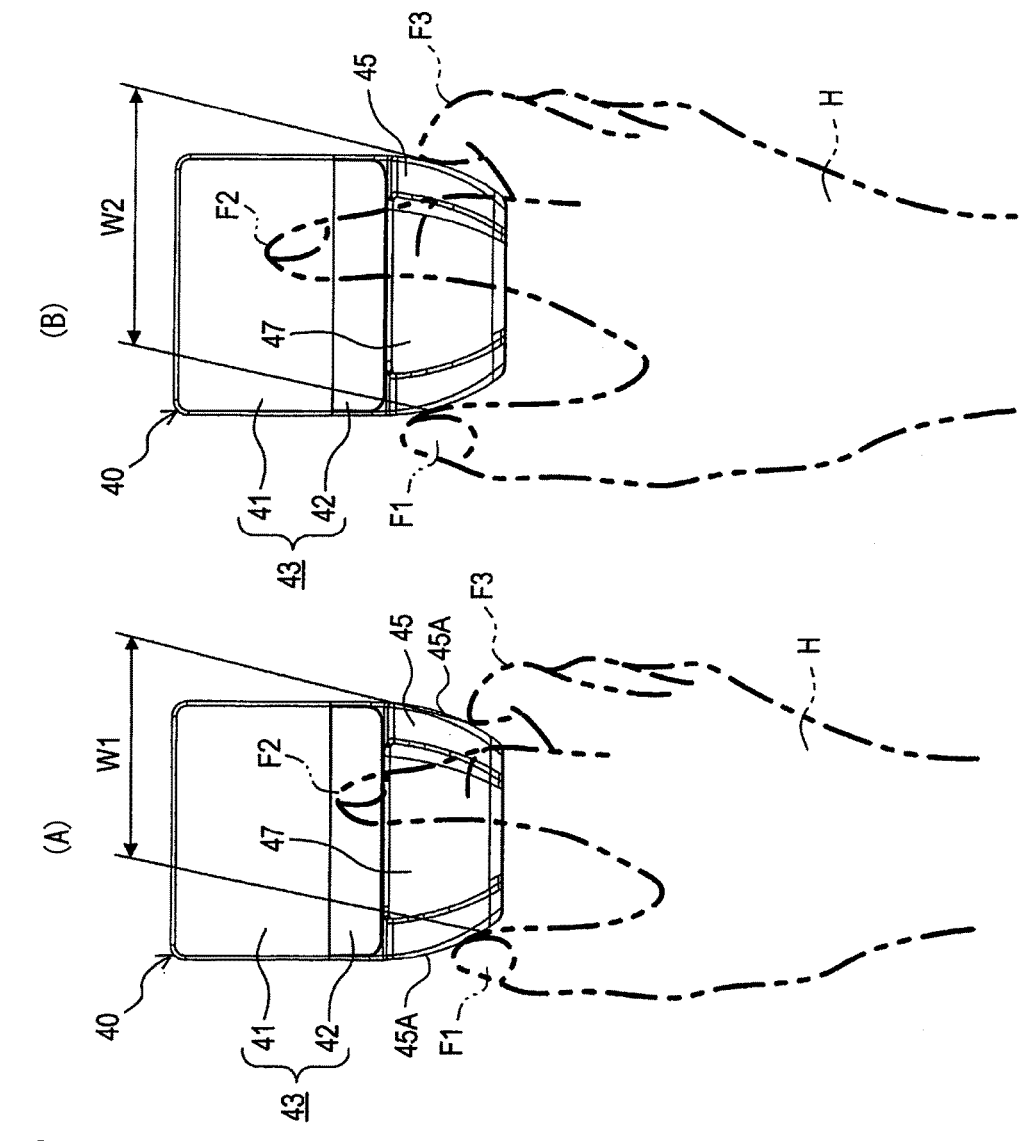
FIGS. 15(A) and (B) are diagrams illustrating other advantageous effects of the operating device.

The present disclosure is not limited to the foregoing embodiment but can be embodied in various other ways. For example, even when the pair of left and right lateral surfaces 45A of the operating knob portion 45 is each shaped like a staircase, an advantageous effect described with reference to FIG. 15 is produced. Although this advantageous effect is not produced, the pinch portion of the operating knob portion 45 may be shaped like a simple rectangle. Another alternative is to use the operating knob portion 45 without the pinch portion so that the lateral surfaces of the touchpad portion 44 are to be directly pinched. Still another alternative is to fasten the touchpad portion 44 to the mounting face 35 so that the operating portion is not capable of moving in the XY-direction.

In the foregoing embodiment, the position of the operating portion 40 is fixed (S8) by the pair of motors 53 to inhibit the operating portion 40 from moving when the operating surface 43 is operated (S1: Y). However, such control need not always be exercised. In the foregoing embodiment, however, the position of the operating portion 40 is fixed when the operating surface 43 is operated. This further improves the operability of the operating surface 43.

Further, the operating surface 43 need not always be divided into the first portion 41 and the second portion 42, but may be entirely formed as a curved surface. In such an instance, too, the advantageous effect described earlier with reference to FIG. 14 is produced as far as a portion of the operating surface 43 that is close to the palm rest 37 is inclined so that the portion of the operating surface 43 becomes closer to the palm-resting surface 37A as the portion of the operating surface 43 is closer to the palm rest 37, as compared with another portion of the operating surface 43 that is apart from the palm rest 37. In this case, it does not matter whether or not the operating surface 43 is divided into the first portion 41 and the second portion 42, which differ in the acceptable operation.

In that regard, because the operating surface 43 in the foregoing embodiment is configured so that the surfaces of the first portion 41 and the second portion 42 are not parallel to each other, the first portion 41 and the second portion 42 can be selectively used while they differ in the acceptable operation. Thus, the operator can determine without looking at the operating surface 43 whether the index finger F2 is in contact with the first portion 41 or the second portion 42. As a result, so-called blind operations can be performed. Further, the first portion 41 and the second portion 42 may alternatively be formed of separate, independent touch panels.

In the foregoing embodiment, a region having a predetermined width at the boundary between the first portion 41 and the second portion 42 is provided as a dead zone that does not detect whether it is touched by a fingertip. However, the dead zone need not always be provided. It should be noted, however, that the dead zone makes it possible to clearly distinguish between an operation performed on the first portion 41 and an operation performed on the second portion 42.

The enter switch 38 need not always be provided. Even when the enter switch 38 is provided, the concave 47 for the enter switch 38 need not always be provided. The operating device 30 according to the foregoing embodiment includes the enter switch 38 that is disposed at an operating surface 43 side end of the palm rest 37, and is manipulated in a direction toward or away from the operating portion 40. Further, the concave 47 is formed on the operating portion 40 to face the enter switch 38. This prevents, for example, the nail N from coming into contact with the operating portion 40 when the enter switch 38 is operated. Thus, the operability of the enter switch 38 improves.

If the vertical interval between the enter switch 38 and the operating knob portion 45 is long, the operability of the enter switch 38 may be assured without need to provide the concave 47. In such an instance, however, the interval between the operating knob portion 45 and the palm-resting surface 37A may increase to decrease the operability of the operating knob portion 45. Meanwhile, when the concave 47 is provided as described in conjunction with the foregoing embodiment, the interval between the operating knob portion 45 and the palm-resting surface 37A can be decreased to not only maintain the operability of the operating knob portion 45 but also maintain the operability of the enter switch 38 as described earlier.

The use of the input device is not limited to those described in conjunction with the foregoing embodiment. For example, the input device may alternatively be mounted on a dashboard, a steering wheel, or a door trim. The input device may be used not only for vehicles but also for various other purposes. For example, the input device may be provided for a personal computer or its peripheral device. Further, the configurations of the foregoing embodiment and its modifications may be combined in an arbitrary manner.

What is claimed is:

1. An input device comprising:
   an operating portion having an operating surface that accepts an operating input made by a fingertip; and
   a palm rest that is positioned forward of the operating surface as viewed from an operator who places a palm on the palm rest, wherein a tangent plane of a palm-resting surface of the palm rest is disposed on a front surface side of the operating surface,
   wherein the operating portion further accepts an operating input made by moving the operating portion,
   wherein the operating portion is disposed on a mounting surface and is configured to be movable in a front-rear direction and in a left-right direction so as to accept an operating input made by moving the operating portion, and
   wherein a portion of the operating surface is inclined so that the portion of the operating surface becomes closer to the palm-resting surface of the palm rest as the portion of the operating surface is closer to the palm rest, as compared with another portion of the operating surface that is apart from the palm rest.

2. The input device according to claim 1, wherein:
   the operating surface includes a first portion positioned apart from the palm rest and a second portion closer to the palm rest;
   the first portion is planar and parallel to a supporting face that supports the operating surface;
   the second portion is planar and inclined so that the second portion becomes closer to the palm-resting surface of the palm rest as the second portion is closer to the palm rest; and
   the first portion and the second portion differ in acceptable operating input.

3. The input device according to claim 2, wherein
   a region having a predetermined width at a boundary between the first portion and the second portion does not accept the operating input from the fingertip.

4. The input device according to claim 1, further comprising:
   a movement inhibition portion that inhibits the operating portion from moving while the operating surface accepts the operating input.

5. The input device according to claim 1, wherein
   the operating portion includes a pinch portion for the operator to pinch to move the operating portion, wherein the pinch portion is closer to the palm rest than the operating surface.

6. The input device according to claim 5, wherein the pinch portion includes a plurality of portions that differ in width in the direction of pinching.

7. The input device according to claim 1, further comprising:
a switch that is disposed at an operating surface side end of the palm rest and is manipulated in a direction toward or away from the operating portion,
wherein the operating portion has a concave surface that is formed to face the switch.

8. A vehicle comprising the input device according to claim 1.

9. An input device comprising:
an operating portion having an operating surface that accepts an operating input made by a fingertip; and
a palm rest that is positioned forward of the operating surface as viewed from an operator who places a palm on the palm rest, wherein a tangent plane of a palm-resting surface of the palm rest is disposed on a front surface side of the operating surface,
wherein the operating portion further accepts an operating input made by moving the operating portion,
wherein a portion of the operating surface is inclined so that the portion of the operating surface becomes closer to the palm-resting surface of the palm rest as the portion of the operating surface is closer to the palm rest, as compared with another portion of the operating surface that is apart from the palm rest, and
wherein the operating portion includes a pinch portion for the operator to pinch to move the operating portion, wherein the pinch portion is closer to the palm rest than the operating surface.

10. The input device according to claim 9, wherein:
the operating surface includes a first portion positioned apart from the palm rest and a second portion closer to the palm rest;
the first portion is planar and parallel to a supporting face that supports the operating surface;
the second portion is planar and inclined so that the second portion becomes closer to the palm-resting surface of the palm rest as the second portion is closer to the palm rest; and
the first portion and the second portion differ in acceptable operating input.

11. The input device according to claim 10, wherein a region having a predetermined width at a boundary between the first portion and the second portion does not accept the operating input from the fingertip.

12. The input device according to claim 9, further comprising:
a movement inhibition portion that inhibits the operating portion from moving while the operating surface accepts the operating input.

13. The input device according to claim 9, wherein the pinch portion includes a plurality of portions that differ in width in the direction of pinching.

14. The input device according to claim 9, further comprising:
a switch that is disposed at an operating surface side end of the palm rest and is manipulated in a direction toward or away from the operating portion,
wherein the operating portion has a concave surface that is formed to face the switch.

15. A vehicle comprising the input device according to claim 9.

16. An input device comprising:
an operating portion having an operating surface that accepts an operating input made by a fingertip;
a palm rest that is positioned forward of the operating surface as viewed from an operator who places a palm on the palm rest, wherein a tangent plane of a palm-resting surface of the palm rest is disposed on a front surface side of the operating surface, and
a switch that is disposed at an operating surface side end of the palm rest and is manipulated in a direction toward or away from the operating portion,
wherein the operating portion further accepts an operating input made by moving the operating portion,
wherein a portion of the operating surface is inclined so that the portion of the operating surface becomes closer to the palm-resting surface of the palm rest as the portion of the operating surface is closer to the palm rest, as compared with another portion of the operating surface that is apart from the palm rest, and
wherein the operating portion has a concave surface that is formed to face the switch.

17. The input device according to claim 16, wherein:
the operating surface includes a first portion positioned apart from the palm rest and a second portion closer to the palm rest;
the first portion is planar and parallel to a supporting face that supports the operating surface;
the second portion is planar and inclined so that the second portion becomes closer to the palm-resting surface of the palm rest as the second portion is closer to the palm rest; and
the first portion and the second portion differ in acceptable operating input.

18. The input device according to claim 17, wherein a region having a predetermined width at a boundary between the first portion and the second portion does not accept the operating input from the fingertip.

19. The input device according to claim 16, further comprising:
a movement inhibition portion that inhibits the operating portion from moving while the operating surface accepts the operating input.

20. A vehicle comprising the input device according to claim 16.

* * * * *